318-135

CROSS REFERENCE SEARCH RO

April 9, 1968 A. D. BRISBANE 3,377,489

POSITION CONTROL DEVICE

Filed Nov. 4, 1965

Inventor
A.D. BRISBANE
By Robert G. Crooke
Attorney

United States Patent Office 3,377,489
Patented Apr. 9, 1968

3,377,489

POSITION CONTROL DEVICE

Alan Douglas Brisbane, London, England, assignor to International Standard Electric Corporation, New York, N.Y., a corporation of Delaware Filed Nov. 4, 1965, Ser. No. 506,378
Claims priority, application Great Britain, Nov. 6, 1964, 45,300/64
6 Claims. (Cl. 310—8.3)

ABSTRACT OF THE DISCLOSURE

An electromechanical actuator utilizing a piezo-electric material which when subjected to an electrical potential results in mechanical distortion of the material, either torsional movement or variations in dimensions. In operation, one portion of the piezo-electric material is held in position during the application of a voltage to cause mechanical distortion of other portions. Thereafter, the moved or distorted portions of the material are locked in their distorted positions. Following the release of the first-held portion and removal of the noted potential, the piezo-electrical material reverts to its normal non-distorted condition, but in a different location. This incremental movement of the piezo-electric material from one location to another may be used for accurate positioning functions.

This invention relates to an electro-mechanical actuator.

The step by step modular positioning of machine tool work supporting tables is commonly effected by suitably connected position control devices which are purely mechanical or hydraulic in operation.

Where it is required to have high operating speed coupled with small accurate incremental movements, these commonly used devices may not be suitable.

An object of the present invention is to enable a work table to be positioned on a step by step basis both accurately and at a reasonably high speed.

According to one aspect of the invention there is provided a step-by-step electromechanical actuator including a piezo-electrically responsive operating member.

According to another aspect of the invention there is provided a step-by-step electromechanical actuator including a piezo-electric operating member, means for repetitively applying an electrical potential to said member so as to cause successive torsional distortion or dimensional variation of said member about or along an axis thereof, and means for translating said successive torsional distortion of dimensional variation into a uni-directional rotational or linear driving movement about or along said axis.

Three preferred embodiments of the invention will now be described with reference to the accompanying drawings, in which.

Figure 1:
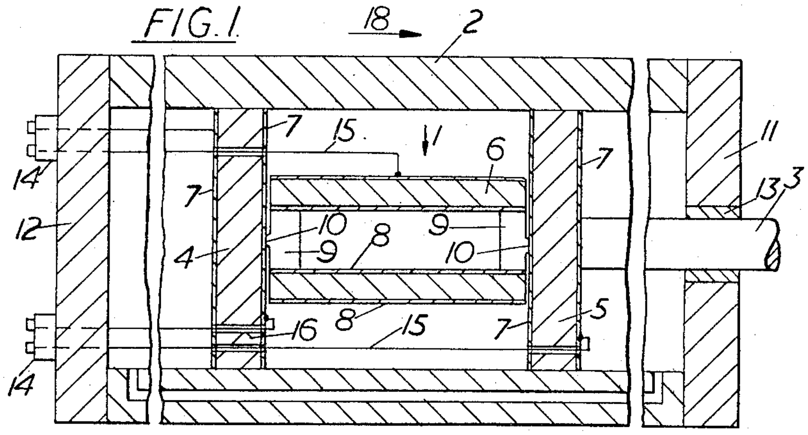
FIG. 1 is a sectioned view of the first embodiment.

The device shown in FIG. 1 basically comprises a driving member 1 movable in either direction within a retaining hollow cylinder 2, and a connecting rod 3 attached to one end of the driving member 1 and extending from the cylinder 2 for attachment to, for example, a work supporting table for the step by step or modular positioning of the table on operation of the device.

Two such devices arranged at right angles to each other and each connected to a co-ordinately movable table will be capable of positioning the table as required on a co-ordinate basis. The retaining cylinders are fastened to convenient points on the machine base.

The driving member comprises a unitary structure of identical end discs 4 and 5 of piezo-electric ceramic material interconnected by a hollow cylinder 6 of piezo-electric ceramic material. A suitable material is barium titanate or barium zirconate.

The discs 4 and 5 each have metal electrode coatings 7, for example silver, of opposite faces therof, and the piezo-electric effect of the discs 4 and 5 is so arranged that on the setting up of an electric potential between the electrodes 7 of either disc, the disc undergoes a radial contraction.

The inner surface of the retaining cylinder 2 is accurately bored so that when unenergized the discs 4 and 5 are locked tight in the retaining cylinder 2.

The interconnecting cylinder 6 is provided with a metal electrode coating 8 on the inner and outer surfaces thereof, and the piezo-electric effect of the cylinder 6 is so arranged that on the setting up of an electric potential between the electrodes 8 across the thickness of the cylinder 6, the cylinder 6 is distorted so as to undergo a dimensional expansion along its longitudinal axis.

The discs 4 and 5 are fastened to opposite ends of the cylinder 6 by conducting metal inserts or plugs 9, for example of brass, inserted into each end of the cylinder 6, the outer faces of the inserts each having a central projection 10 which is soldered to the centre of the inner electrode 7 of the corresponding one of the discs 4 and 5.

The outer electrode 8 of the cylinder 6 is thus spaced from the inner electrodes 7 of the discs 4 and 5, and the inner electrode 8 of the cylinder 6 electrically interconnects the inner electrodes 7 of both the discs 4 and 5 via the conducting inserts 9.

By attaching the interconnecting cylinder 6 only to the small central area of the discs 4 and 5, substantially the whole of the radial dimensional change of the discs is effective.

The driving member 1 may be contained in air within an open ended retaining cylinder, but preferably, as shown in FIG. 1, the driving member 1 is enclosed within the retaining cylinder 2 and immersed in an insulating oil. Accordingly the ends of the reaining cylinder are closed by end closure members 11 and 12.

The end closure member 11 carries an oil seal 13 through which passes the connecting rod 3. The end closure member 12 is provided with external electrical terminals 14 to which are connected the individual outer electrodes 7 and 8 of the discs 4 and 5 and the cylinder 6, and the commoned inner electrodes 7 and 8.

Connection is by flexible lead wires such as 15 having sufficient slack to accommodate the stroke of the driving member, and where necessary passing through apertures 16 in the discs 4 and 5.

An oil return pipe is provided for pressure equalisation on movement of the driving member.

To cause the driving member 1 to be moved in the direction indicated by the arrow 18, operation is as follows.

An electrical potential is applied across the disc 5, causing a radial contraction. The disc 5 is now free to slide along the bore of the cylinder 2. With the potential maintained across the disc 5, an electrical potential is applied across the cylinder 6 which causes a length expansion of the cylinder 6 and therefore the disc 5 is moved along the bore of the cylinder 2 in the required direction.

With the potential maintained across the cylinder 6, the potential across the disc 5 is removed and the disc 5 is locked tight in the bore of the cylinder 2. An electrical potential is now applied across the disc 4, causing the disc 4 to contract radially. With the potential maintained across the disc 4, the potential across the cylinder 6 is removed, the cylinder 6 shortens to its original length and in so doing drags the disc 4 along the bore of the cylinder 2. The potential across the disc 4 is removed so that the disc 4 is locked tight in the bore of the cylinder 2, and the unit has completed one sequence of operation.

It will be seen that for one complete pulse sequence the complete unit has moved along the bore of the retaining cylinder 2 by an amount dependent on the relative expansion of the cylinder 6. The machine table is of course moved by the same amount.

For operation in the opposite direction, the pulse sequence is reversed.

Typically, one sequence step of the driving member 1 is of the order of 0.0002 inch with a pulse sequence frequency of 104 per sec., so that the device imparts a movement of 2 inches per second.

The interconnecting cylinder 6 may be replaced by a member of piezo-electric material which undergoes torsional distortion along its longitudinal axis on the application of an electric potential via suitably positioned electrodes, and if a similar sequence of pulse operation is followed for alternately locking and releasing the disc 4 and 5, overlapping with twisting and restoration of the interconnecting member, a step by step or modular rotation of the connecting rod 3 will be obtained as the driving member 1 is rotated within the retaining cylinder 2.

This enables the angular positioning of a rotor connected to the connecting rod to be effected.

Instead of the retaining cylinder being held stationary and the driving member moving therein, the retaining cylinder may be free to move and connected to the work table or rotor to be stepped with the driving member held stationary at one end of the driving member.

Figures 2, 3:
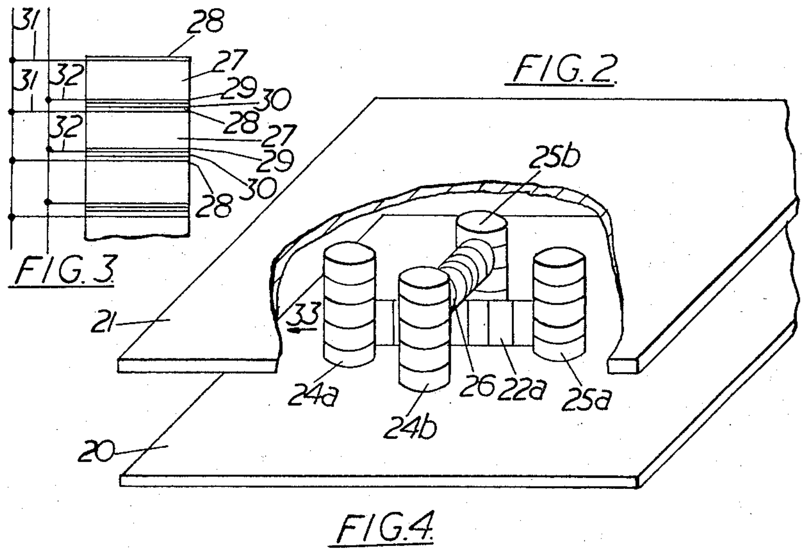
FIG. 2 is a perspective view of the second embodiment.
FIG. 3 shows additional details of the second embodiment.
Figure 4:
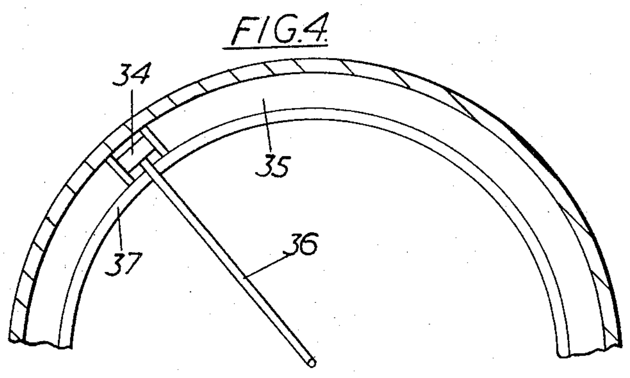
FIG. 4 is a plan view of the third embodiment.

In FIG. 2, two position control devices are contained within parallel fixed plates 20 and 21. Each device comprises an interconnecting cylinder such as 22*a*, made up of a number of discs bonded together, between end-stacks 24*a* and 25*a* or 24*b* and 25*b* each of a number of discs bonded together.

The interconnecting cylinders of each device are offset by an equal amount above and below the centre line of the end-stacks 24 and 25 which are of equal height, and are bonded together at right angles at their cross point 26.

The cylinders 22 and the end-stacks 24 and 25 are each comprised of discs 27 (as shown in FIG. 3) each having metal electrode coatings 28 and 29 on opposite faces, the electrodes 28 and 29 of adjacent discs 27 being insulated from each other by an insulating layer 30 which may conveniently be formed by the bonding agent, for example a cold setting adhesive.

The discs 27 are of piezo-electric ceramic material having a piezo-electric effect so chosen that, on the application thereto of an electric potential, a thickness expansion results.

Lead wires 31 are connected to each of the electrodes 28 of the discs in a single end-stack or interconnecting cylinder, and lead wires 32 are connected to each of the electrodes 29.

For each end-stack and interconnecting cylinder the wires 31 are connected to one side of a suitable potential source (not shown) and the wires 32 are connected to the other side of the source.

The spacing of the plates 20 and 21 is such that with the devices unenergised, the height of the end-stacks 24 and 25 is less than the distance between the facing surfaces of the plates.

In order to move the device in the direction indicated by the arrow 33, operation is as follows.

An electric potential is applied to the discs of the end-stack 25*a* causing a thickness expansion of the discs and an increase in height of the end-stack 25*a* so that the end-stack 25*a* is locked tight between the plates 20 and 21.

With potential still applied to the end-stack 25*a*, a potential is applied to interconnecting cylinder 22*a*. The discs of this cylinder undergo a thickness expansion and the end-stack 24*a*, which is free between the end plate 20 and 21, is moved along the plate 20 due to the increase in length of the cylinder 22*a*.

With potential still applied to the end-stack 25*a* and the cylinder 22*a*, a potential is applied to the end stack 24*a* which is expanded to lock tight between the plates 20 and 21.

With potential still applied to the cylinder 22*a* and the end-stack 24*a*, the potential applied to the end stack 25*a* is removed so that the end-stack 25*a* reverts to its normal height and is free to move between the plates 20 and 21.

With potential still applied to the end-stack 24*a*, the potential applied to the cylinder 22*a* is removed so that the cylinder 22*a* reverts to its normal length and in so doing drags the end-stack 25*a* in the direction of the arrow 33.

To complete one operating sequence, the potential is removed from the end-stack 24*a*.

For operation in the opopsite direction, the pulse sequence is reversed.

Operation of the other (*b*) unit to move in a direction at right angles to the (*a*) unit is analogous to that for the (*a*) unit.

The interconnecting cylinder construction of the second embodiment of bonded discs each undergoing a thickness expansion may replace the hollow interconnecting cylinder construction of the first embodiment, and vice versa.

In the third embodiment shown in FIG. 3, a driving unit 34, constructed and operated as in the first embodiment, is contained within a hollow retaining cylinder 35 which is shaped as an annulus (or part of an annulus). The driving unit 34 is connected to one end of a connecting rod 36 which passes through a slot 37 in the retaining cylinder, and the other end of the connecting rod 36 is pivotally fastened at the centre point of the annular retaining cylinder 35.

It will be apparent that step-by-step linear actuation of the driving unit 34 along the retaining cylinder 35 will cause a corresponding step-by-step rotary motion to be imparted to the connecting rod 36 and accordingly a rotary step-by-step drive will be imparted to a rotor, for example, a rotatable work table, fastened to the connecting rod, with the centre point of the rotor coaxial with the centre point of the rotor coaxial with the centre point of the annular cylinder 35.

It is to be understood that the foregoing description of specific examples of this invention is made by way of example only and is not to be considered as a limitation on its scope.

What we claim is:

1. An electromechanical actuator including a piezo-electric operating member, means for holding a first portion of said operating member against movement, means for applying an electrical potential to said operating member to cause a second portion thereof to move, means for holding the second portion in its moved posi.ion and for releasing the said first portion for movement, and means for removing the electrical potential to cause the first portion of said operating member to follow the said movement of the second portion of the operating member.

2. An actuator as set forth in claim 1 whereas the said movement of the second portion of the operating member is a dimensional variation of the operating member.

3. An actuator as set forth in claim 1 wherein the said movement of the second portion of the operating member is rotational.

4. An actuator as set forth in claim 1 wherein said piezo-electric operating member comprises a hollow cylinder of piezo-electric material provided with separate electrodes on the inner and outer surfaces thereof for the application of the electric potential thereto.

5. An actuator as set forth in claim 1 wherein said holding means includes a piezo-electric holding member and wherein operation of said holding means is controlled by the application and removal of an electrical potential to said piezo-electric holding member.

6. An actuator as set forth in claim 5 wherein said piezo-electric holding member comprises a stack of piezo-electric discs each provided with separate electrodes on the opposite major surfaces thereof for the application of an electrical potential thereto.

References Cited

UNITED STATES PATENTS

| | | | |
|---|---|---|---|
| 3,104,349 | 9/1963 | Stevens | 310—26 |
| 3,154,700 | 10/1964 | McNaney | 310—8.3 |
| 3,138,749 | 6/1964 | Stibitz | 310—26 |
| 3,233,749 | 2/1966 | Devol | 310—26 |
| 3,296,467 | 1/1967 | Locher | 310—8.1 |

MILTON O. HIRSHFIELD, *Primary Examiner.*

J. D. MILLER, *Examiner.*